(12) United States Patent
Park et al.

(10) Patent No.: US 7,508,483 B2
(45) Date of Patent: Mar. 24, 2009

(54) LIQUID CRYSTAL DISPLAY DEVICE WITH TEMPERATURE SENSOR FOR CONTROLLING HEATING VOLTAGE TO CONDUCTIVE BLACK MATRIX OF PANEL THROUGH CONDUCTIVE SEALANT

(75) Inventors: Jin-Woo Park, Suwon-si (KR); Tae-Soo Kim, Suwon-si (KR); Tae-Hyeong Jung, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 657 days.

(21) Appl. No.: 11/126,482

(22) Filed: May 11, 2005

(65) Prior Publication Data

US 2005/0286010 A1      Dec. 29, 2005

(30) Foreign Application Priority Data

Jun. 29, 2004    (KR)    ............... 10-2004-0049302

(51) Int. Cl.
*G02F 1/13*    (2006.01)
(52) U.S. Cl. .................. 349/199; 349/44; 349/110; 349/111
(58) Field of Classification Search ............... 349/199, 349/44, 110, 111
See application file for complete search history.

(56) References Cited

U.S. PATENT DOCUMENTS 4,460,247 A * 7/1984 Hilsum et al. ............... 349/199

| | | | |
|---|---|---|---|
| 6,535,266 B1 | 3/2003 | Nemeth et al. |
| 6,573,882 B1 | 6/2003 | Takabayashi |
| 2004/0036834 A1 | 2/2004 | Ohnishi et al. |
| 2004/0164946 A1 | 8/2004 | Cavanaugh et al. |

FOREIGN PATENT DOCUMENTS

| | | |
|---|---|---|
| CN | 1246633 | 3/2000 |
| JP | 64-037536 | 2/1989 |
| JP | 8-211368 | 8/1996 |
| JP | 9-96796 | 4/1997 |
| JP | 2000-194313 | 7/2000 |
| JP | 2003-131191 | 5/2003 |

OTHER PUBLICATIONS

Machine translation of Yamakita—JP 2003-131191, cited in IDS of Feb. 27, 2006.*

(Continued)

*Primary Examiner*—David Nelms
*Assistant Examiner*—John Heyman
(74) *Attorney, Agent, or Firm*—Christie, Parker & Hale, LLP

(57) ABSTRACT

A liquid crystal display and a driving method thereof which enables stable operation at a low temperature. A liquid crystal display includes a panel with a first substrate on which a conductive black matrix is formed and a second substrate which faces the first substrate, and liquid crystal interposed between the substrates. The first and second substrates are assembled together using a sealant. The liquid crystal display further includes a temperature sensor for sensing a temperature of the panel and/or a temperature of its surroundings, and a power supply for controlling the temperature of the panel in response to the temperature sensed by the temperature sensor.

11 Claims, 4 Drawing Sheets

OTHER PUBLICATIONS

Patent Abstracts of Japan for Publication No. 08-211368; Date of publication of application Aug. 20, 1996, in the name of Masanaru Abe.

Patent Abstracts of Japan for Publication No. 09-096796; Date of publication of application Apr. 8, 1997, in the name of Minoru Kanbara.

Patent Abstracts of Japan for Publication No. 2003-131191; Date of publication of application May 8, 2003, in the name of Hirofumi Yamakita et al.

Patent Abstracts of Japan, Publication No. 2000-194313, dated Jul. 14, 2000, in the name of Katsuhiro Hanetaki et al.

* cited by examiner

LIQUID CRYSTAL DISPLAY DEVICE WITH TEMPERATURE SENSOR FOR CONTROLLING HEATING VOLTAGE TO CONDUCTIVE BLACK MATRIX OF PANEL THROUGH CONDUCTIVE SEALANT

CROSS REFERENCE TO RELATED APPLICATION

This application claims priority to and the benefit of Korean Patent Application No. 10-2004-0049302, filed on Jun. 29, 2004 in the Korean Intellectual Property Office, the entire content of which is incorporated herein by reference.

BACKGROUND OF THE INVENTION

1. Field of the Invention

The present invention relates to a liquid crystal display and a driving method thereof, and more particularly, to a liquid crystal display (LCD) and a driving method thereof which enable stable operation at a low temperature.

2. Description of the Related Art

As personal computers and TVs have recently become lighter and thinner, display devices need to become lighter and thinner as well. Accordingly, flat panel display devices such as an LCD have been developed and substituted for the cathode ray tube (CRT).

In the LCD, a liquid crystal layer with dielectric anisotropy is injected between two substrates of a panel, and the light transmittivity of the panel is controlled by applying and controlling an electric field. Desired images are obtained in such a manner.

The LCD is the most common representative display among flat panel displays, and in particular the thin film transistor liquid crystal display (TFT-LCD) employing the TFT as a switching element is most widely used.

Each pixel of the TFT-LCD can be modeled as a liquid crystal capacitor because electrodes (pixel electrodes and a common electrode) are arranged facing each other with liquid crystal inserted therebetween. Each pixel of the TFT-LCD can be indicated as an equivalent circuit such as shown in FIG. 1.

As shown in FIG. 1, each pixel of an LCD includes a TFT 10 having a source electrode coupled to a data line Dm and a gate electrode coupled to a scan line Sn, a liquid crystal capacitor Cl coupled between a drain electrode of the TFT 10 and a common electrode Vcom, and a storage capacitor Cst coupled to the drain electrode of the TFT 10.

The TFT 10, responding to a scan signal from the scan line Sn, supplies the data voltage Vd from the data line Dm to each pixel electrode (not illustrated) through the TFT 10. Then, an electric field corresponding to a difference between the pixel voltage Vp supplied to the pixel electrode and the common voltage Vcom supplied to the common electrode is supplied to the liquid crystal (shown as the liquid crystal capacitor Cl equivalently in FIG. 1). The storage capacitor Cst maintains the pixel voltage Vp supplied to the liquid crystal capacitor Cl until the next data voltage is supplied so that a desired amount of light can be transmitted through the liquid crystal during one period.

In general, LCDs can be classified according to the method of indicating color images into two groups. The methods include a color filter method and a field sequential driving method.

An LCD using the color filter method has a color filter layer which has the three primary colors of red R, green G, and blue B on the upper substrate of the panel, and displays desired images by controlling the transmittance of light therethrough. However, an LCD using the color filter method needs three times more pixels as compared with an LCD for displaying black and white because unit pixels corresponding to red R, green G, and blue B colors are needed. Therefore, a delicate panel manufacturing technology is needed to obtain high resolution images. Further, an LCD using the color filter method is difficult to manufacture because a color filter for each of red R, green G, and blue B colors needs to be formed.

An LCD using the field sequential driving method turns on light sources for red R, green G, and blue B lights sequentially and periodically, and displays color images by supplying the pixel voltage Vp to each pixel at each turning on period. The LCD using the field sequential driving method does not divide each pixel into unit pixels of red R, green G, and blue B colors, but displays three primary colors of red R, green G, and blue B using different color backlights by time-dividing the lights and sequentially applying them, and then expressing color images using eye's afterimage effect.

The LCD using the field sequential driving method drives one frame by dividing it into an R field, a G field, and a B field, and thus the response speed of the liquid crystal of LCD should be faster than that of the LCD using the color filter method. But since the response time of liquid crystal in a portable device (i.e., cellular phone), which is frequently exposed to low temperatures, decreases as the temperature decreases, a problem occurs in which the color reproducibility is degraded according to a decrease of response time when using the field sequential driving method.

SUMMARY OF THE INVENTION

In exemplary embodiments according to the present invention, a liquid crystal display (LCD) and a driving method thereof that enable a more stable operation at a low temperature is provided.

In one aspect of the present invention, an LCD includes a panel, a temperature sensor, and a power supply. The panel includes a first substrate on which a conductive black matrix is formed, and a second substrate which faces the first substrate. Liquid crystal is interposed between the first and second substrates. The first and second substrates are assembled together using a sealant.

The temperature sensor senses a temperature of the panel and/or an environment surrounding the panel. The power supply controls the temperature of the panel in response the temperature sensed by the temperature sensor.

The power supply may supply a heating voltage to the black matrix when the temperature sensed by the temperature sensor is below a predetermined temperature.

In another aspect of the present invention, a liquid crystal display (LCD) driving method is provided. The driving method relates to driving an LCD having a panel including a first substrate on which a conductive black matrix is formed and a second substrate which faces the first substrate. Liquid crystal is interposed between the substrates. The first and second substrates are assembled together using a sealant. According to an exemplary driving method of the present invention, a temperature of the panel and/or an environment surrounding the panel is sensed, and the black matrix is heated when the sensed temperature is below a predetermined temperature.

BRIEF DESCRIPTION OF THE DRAWINGS

The accompanying drawings, together with the specification, illustrate exemplary embodiments of the invention, and, together with the description, serve to explain the principles of the present invention.

DETAILED DESCRIPTION

Figure 1:
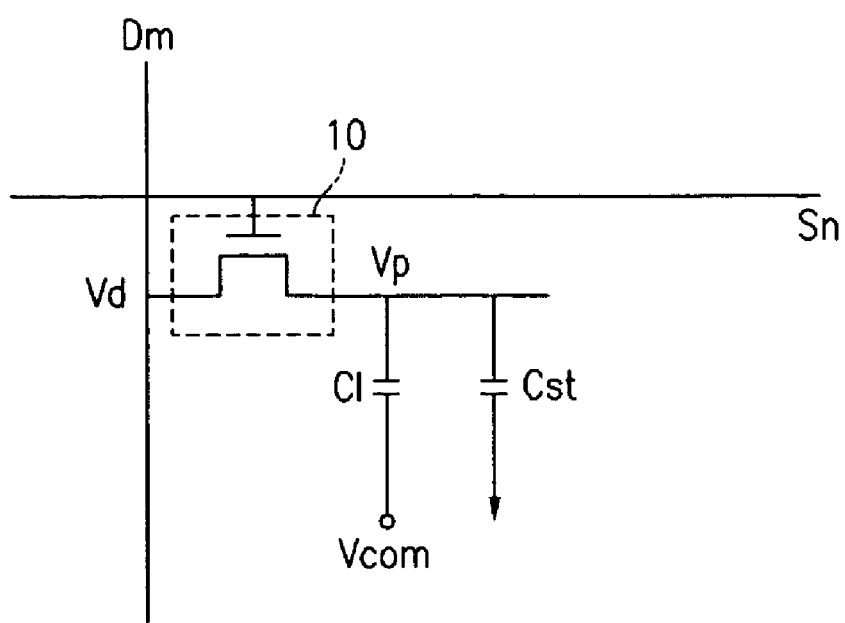
FIG. 1 is an equivalent circuit diagram of a pixel of a conventional TFT-LCD.

In the following detailed description, exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

There may be parts shown in the drawings, or parts not shown in the drawings, that are not discussed in the specification as they are not essential to a complete understanding of the invention. Further, like elements are designated by like reference numerals.

Exemplary embodiments of the present invention will now be described in detail with reference to the attached drawings.

Figure 2:
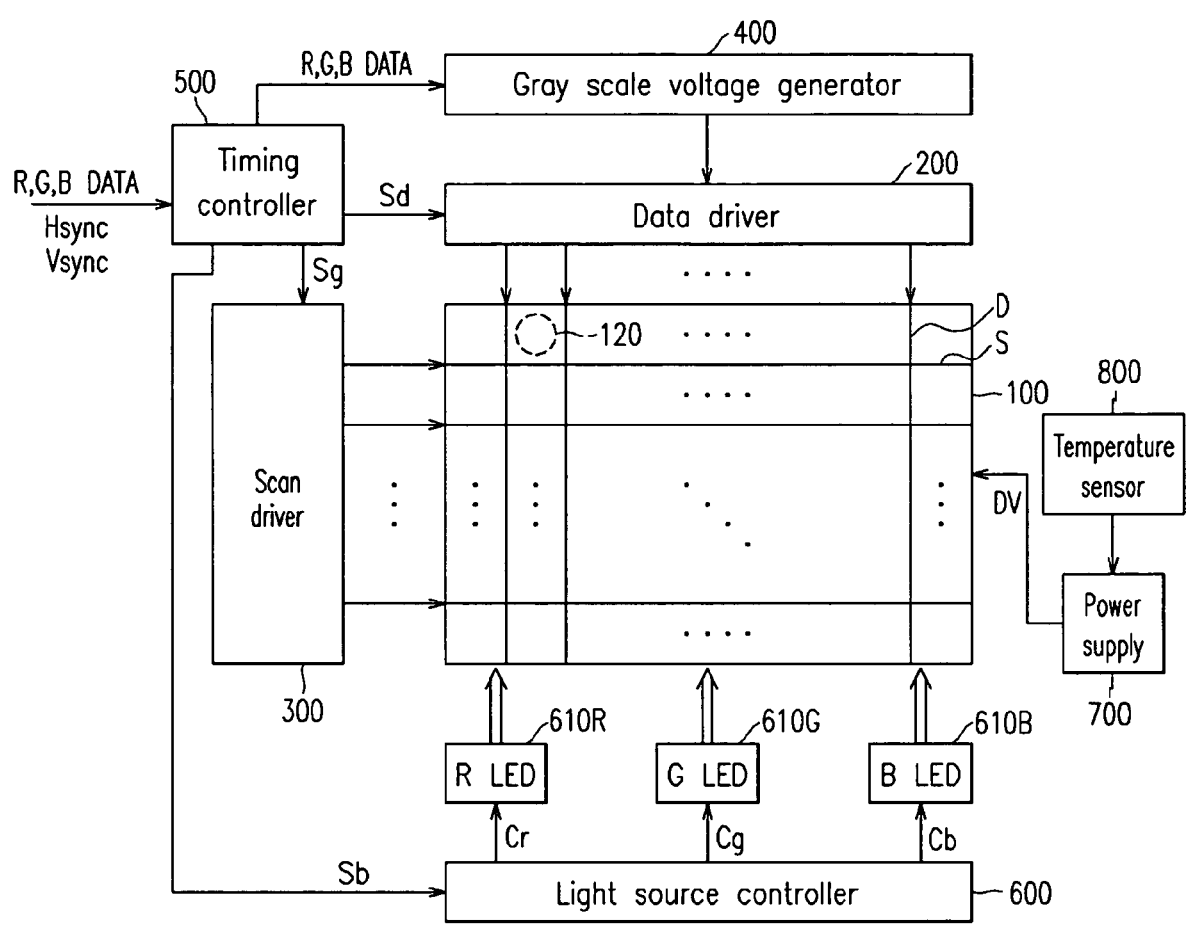
FIG. 2 shows a liquid crystal display according to an exemplary embodiment of the present invention.

FIG. 2 shows a liquid crystal display (LCD) according to an exemplary embodiment of the present invention.

Referring to FIG. 2, the LCD includes a panel 100, a scan driver 300, a data driver 200, a gray scale voltage generator 400, a timing controller 500, light emitting diodes (LEDs) 610R, 610G, and 610B that output red (R), green (G), and blue (B) lights, respectively, a light source controller 600, a temperature sensor 800, and a power supply 700.

The panel 100 includes a plurality of pixels 120 arranged in a matrix format at the crossing regions of scanning lines (S) and data lines (D).

The timing controller 500 receives gray scale data signals (R, G, B data), horizontal synchronization signals (Hsync), and vertical synchronization signals (Vsync) from a graphic controller (not shown) or other exterior devices. The timing controller 500 outputs scanning control signals (Sg) for controlling the scan driver 300, data control signals (Sd) for controlling the data driver 200, and light source control signals (Sb) for controlling the light source controller 600. The timing controller 500 supplies the gray scale signals (R, G, B data) to the gray scale voltage generator 400.

The scan driver 300 sequentially supplies the scan signals to the scan line in response to the scan control signals (Sg) supplied from the timing controller 500 such that horizontal lines to be supplied with data voltage (Vd) are selected.

The gray scale voltage generator 400 generates a gray scale voltage (also called data voltage) (Vd) corresponding to gray scale data signals (R, G, B data), and supplies the generated data voltage (Vd) to the data driver 200. The data driver 200 supplies the data voltage (Vd) to the data line (D), according to the control of the data control signals (Sd).

In response to the light source control signals (Sb), the light source controller 600 controls LEDs 610R, 610G, and 610B so that a red LED, a green LED, and a blue LED may emit light in the respectively different periods (fields) of a frame. In an exemplary embodiment of the present invention, the LED is used for a backlight, but the present invention is not limited to the above-noted embodiment.

The temperature sensor 800 senses a panel temperature and/or an ambient temperature of the environment surrounding the panel. The temperature sensor produces a control signal and supplies the produced control signal to the power supply 700 when the sensed temperature is below a predetermined temperature (e.g., room temperature). According to an exemplary embodiment of the present invention, the predetermined temperature is preset as a value in a range from 10° C. to 25° C.

The power supply 700 supplies a DC voltage (DV) to the panel 100 when the control signal is supplied from the temperature sensor 800. Thus the power supply 700 prevents the temperature of the panel 100 from decreasing to below room temperature. That is, the temperature of the panel 100 is always maintained above the predetermined temperature irrespective of the surrounding temperature because the panel is heated when the temperature of the panel and/or the surrounding environment is sensed to be less than the predetermined temperature. Therefore, the reliability of the LCD can be guaranteed because liquid crystal inserted in the panel maintains a response time beyond a predetermined level.

Figure 3A:
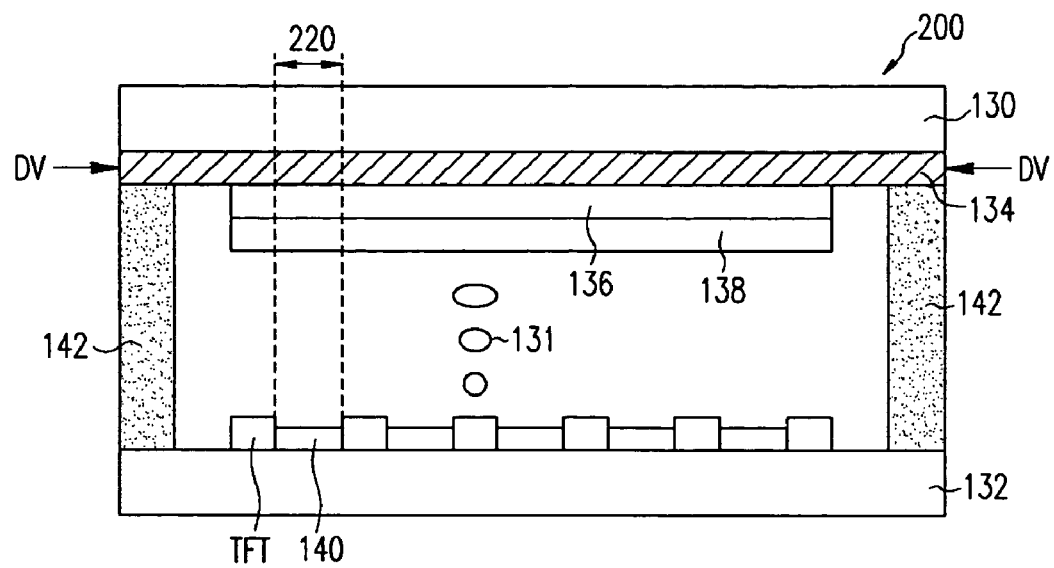
FIG. 3A and FIG. 3B are schematic diagrams that show a structure of a panel according to a first exemplary embodiment of the present invention.
Figure 3B:
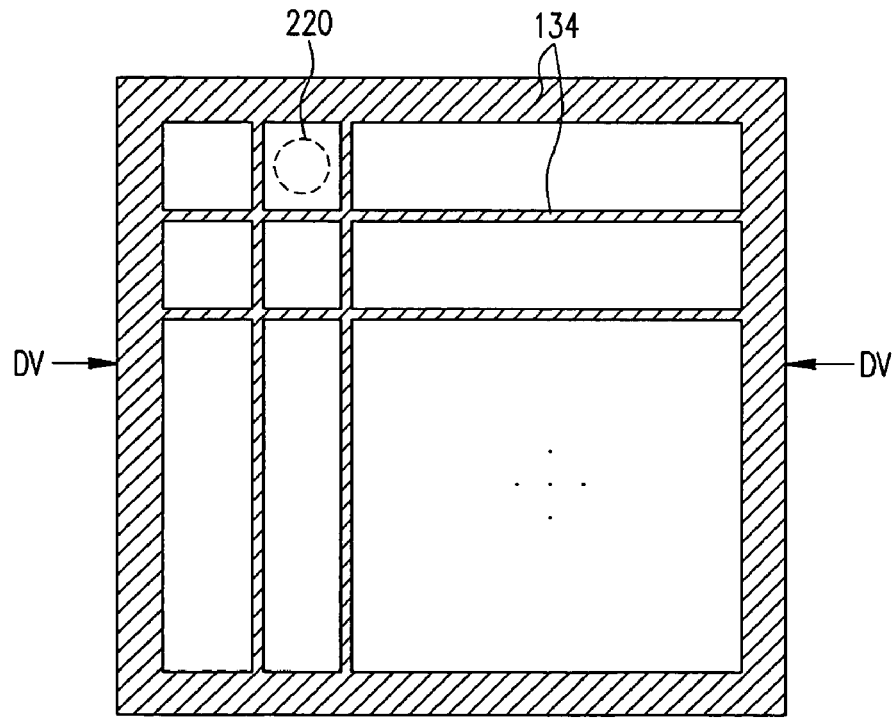

FIG. 3A and FIG. 3B are schematic diagrams that show a structure of a panel 200 according to a first exemplary embodiment of the present invention. The panel 200, for example, can be used as the panel 100 of FIG. 2.

Referring to FIGS. 3A and 3B, the panel 200 includes an upper substrate 130, a lower substrate 132, and liquid crystal 131 injected therebetween.

A black matrix 134, a flattened layer 136, a common electrode 138, and spacers (not shown) are formed sequentially on the upper substrate 130. TFTs and pixel electrodes 140 are formed on the lower substrate 132. The upper substrate 130 and the lower substrate 132 are assembled together and sealed using a sealant 142 with liquid crystal inserted therebetween. The sealant 142 is placed at the edges of the upper substrate 130 and the lower substrate 132, and is overlapped with the black matrix 134 at the edges.

The black matrix 134 is formed corresponding to the TFT areas of the lower substrate 132 and the areas of the scan lines and the data lines which are not shown. The black matrix 134 is defined in a lattice format (to allow the data lines and the scan lines to cross with each other in the horizontal and vertical directions) so that pixel areas 220 can be provided as shown in FIG. 3B. The black matrix 134 prevents light leakage between adjacent pixels and increases contrast by absorbing outer light. The black matrix 134 includes a conductor which, for example, includes chromium (Cr).

The flattened layer 136 is formed between the black matrix 134 and the common electrode 138, and eliminates a level difference of the black matrix 134. The flattened layer 136 flattens a level difference of the black matrix 134 so that the common electrode can be formed at the same height without a level difference. The flattened layer is made of a dielectric material.

The common electrode 138 is formed on the flattened layer 136, and receives an external common voltage (Vcom). The common electrode 138 includes a transparent electrode made, for example, of indium tin oxide (ITO) so that the light supplied from outside through the lower substrate 132 can be transmitted through the common electrode 138 to the upper substrate 130.

The spacers maintain the gap between the upper substrate 130 and the lower substrate 132.

The TFT formed on the lower substrate includes a gate electrode coupled to the scan line, a source electrode coupled to the data line, and a drain electrode coupled to the pixel electrode 140. The TFT responds to the scanning signals supplied from the scanning line, and supplies the data voltage (Vd) supplied from the data line to the pixel electrode 140. Then, corresponding to the difference in voltage (i.e., strength of the electric field) between the data voltage supplied to the pixel electrode 140 and the common voltage supplied to the common electrode, the twist of the liquid crystal is determined, which determines the transmittivity of light. The pixel electrode 140 is made of a transparent conductive material of high light transmittivity so that the light supplied through the lower substrate 132 can be supplied to the upper substrate 130.

The panel 200 maintains its temperature above the predetermined temperature (e.g., above 10° C.). When the temperature of the panel 200 and/or the temperature of the panel's surroundings are sensed as being below the predetermined temperature, the black matrix 134 is heated, and thus the temperature of the panel 200 is increased. Therefore, the temperature of the panel 200 can be maintained above the predetermined temperature irrespective of the temperature of the surroundings.

According to the first exemplary embodiment of the present invention, the temperature sensor 800 shown in FIG. 2 senses the temperature of the panel, or an ambient temperature of the environment surrounding the panel. When the panel 200 is in a condition below the predetermined temperature (e.g., 10° C.), the temperature sensor 800 supplies the control signal to the power supply 700, and the power supply supplies a direct current (DC) voltage DV to the black matrix 134. Hereinafter, the DC voltage for heating of the black matrix 134 will be referred to as a heating voltage.

Since the black matrix 134 includes a conductive material, heat is generated in the black matrix 134 by the supply of the heating voltage, and the panel is heated by the heat. Since the black matrix 134 is formed on the panel 200 in the form of a lattice, the heat generated in the black matrix 134 is delivered substantially uniformly to entire portion of the panel 200.

In this and other embodiments, the heating voltage DV may be applied to the black matrix through electrically contacts at one or more locations. Further, the supplying position of the heating voltage DV supplied to the panel 200 can be changed variously as described below.

Figure 4:
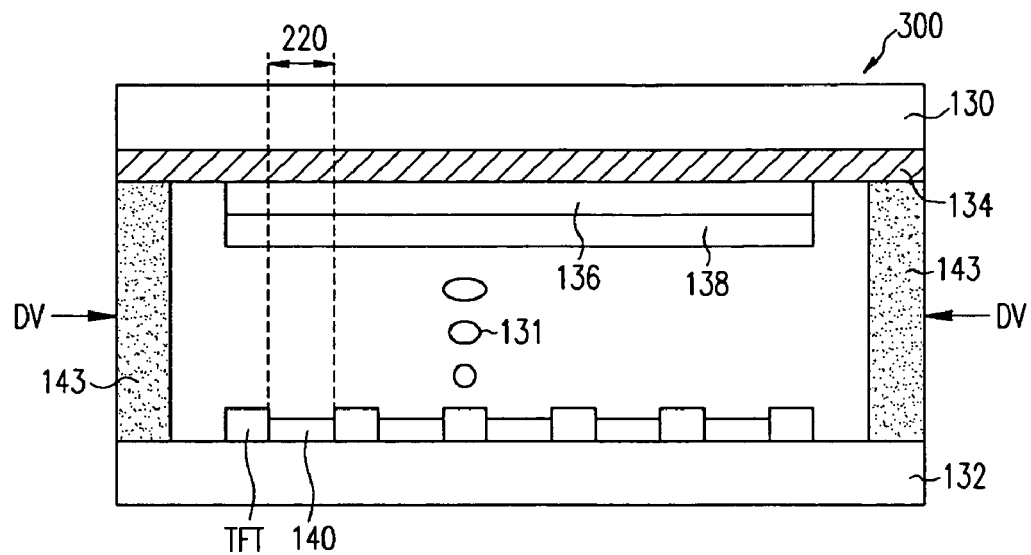
FIG. 4 is a schematic diagram that shows a structure of a panel according to a second exemplary embodiment of the present invention.

FIG. 4 is a schematic diagram which shows a structure of a panel 300 and the supplying position of the heating voltage DV according to a second exemplary embodiment of the present invention. The panel 300, for example, can be used as the panel 100 of FIG. 2. In FIG. 4, the same elements of FIG. 3A are denoted by the same reference numerals, and herein a repeated description will be omitted.

According to the second exemplary embodiment of the present invention, the upper substrate 130 and the lower substrate 132 are coupled together and sealed by a conductive sealant 143. The liquid crystal 131 is interposed between the substrates. In more detail, the sealant is electrically coupled to the black matrix 134. The sealant 143 includes conductive balls to conduct electricity between the substrates, for example.

As shown in FIG. 4, the heating voltage DV supplied from the power supply 700 can be supplied to the sealant 143. The heating voltage DV supplied to the sealant 143 is then supplied to the black matrix 134 because the sealant 143 is electrically coupled with the black matrix 134. The black matrix 134 generates heat by the supplied heating voltage DV, and the temperature of the panel 300 is then maintained to be greater than the predetermined temperature because of the heat.

Figure 5:
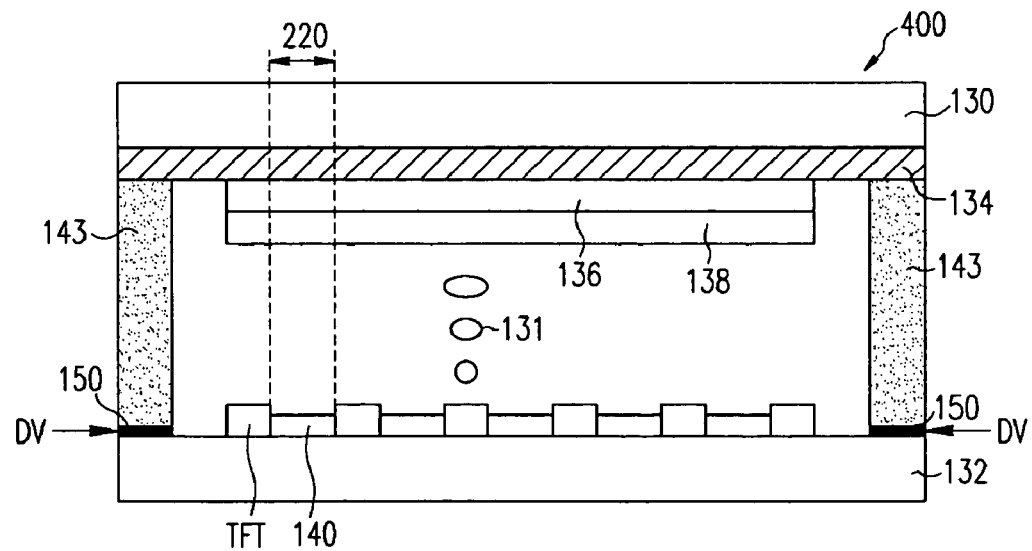
FIG. 5 is a schematic diagram that shows a structure of a panel according to a third exemplary embodiment of the present invention.

FIG. 5 is a schematic diagram which shows a structure of a panel 400 and the supplying position of the heating voltage (DV) according to a third exemplary embodiment of the present invention. The panel 400, for example, can be used as the panel 100 of FIG. 2. In FIG. 5, the same elements of FIG. 4 are denoted by the same reference numerals, and herein a repeated description will be omitted.

As shown in FIG. 5, an auxiliary electrode 150 is formed between the sealant 143 and the lower substrate 132. The heating voltage DV supplied to the auxiliary electrode 150 is supplied to the black matrix 134 through the sealant 143.

According to exemplary embodiments of the present invention described above, only one level has been introduced for the predetermined temperature below which the panel is heated so as to maintain the temperature of the panel above the predetermined temperature. However, it should be understood that the scope of the present invention is not limited thereto. As a variation, a plurality of temperature levels may be introduced for a plurality of predetermined temperatures, and the heating voltage may be applied with different voltage values respectively corresponding to different temperature levels.

For example, a temperature range may be divided into two or more temperature levels, and a higher heating voltage may be used for a lower temperature level. Thus, when the panel temperature is lower, the panel 100, 200, 300 or 400 is heated faster due to higher heating voltage.

In more detail, the temperature sensor 800 supplies control signals differently preset for predetermined temperature levels to the power supply 700. For example, the temperature sensor 800 supplies the control signal of "0000" to the power supply 700 when the temperature of the panel 100, 200, 300 or 400 and/or the temperature of the panel's surroundings are greater than typical room temperature (e.g., 25° C.), and the temperature sensor 800 supplies different control signals, i.e., the control signals of "0001" to "1111" to the power supply 700 depending on the determined temperature levels. Then, in response to the control signal supplied from the temperature sensor 800, the power supply 700 supplies a corresponding heating voltage differently preset for the determined temperature levels. The lower the level of the control signal supplied from the temperature sensor 800 to the power supply 700 corresponds to, the greater is the heating voltage. Thus the heating speed of the panel 100, 200, 300 or 400 can be controlled.

As set forth above, according to the exemplary embodiments of the present invention, lowering of the color representing rate can be prevented because the temperature of a panel is maintained at greater than a specific temperature by heating the panel when the temperature of the panel or its surroundings is sensed as being below the predetermined temperature.

While this invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, in an exemplary embodiment of the present invention above, the LCD using a field sequential driving method was set forth as an example, but it can be applied to various LCDs using other than the field sequential driving method.

What is claimed is:

1. A liquid crystal display (LCD) comprising:
   a panel including a first substrate on which a conductive black matrix is formed and a second substrate which faces the first substrate, and liquid crystal interposed between the substrates, the first and second substrates being assembled together using a sealant;
   a temperature sensor for sensing a temperature of the panel and/or an environment surrounding the panel; and
   a power supply for controlling the temperature of the panel in response to the temperature sensed by the temperature sensors,
   wherein the sealant is a conductive sealant, and
   the power supply transmits a heating voltage to the black matrix through the conductive sealant when the temperature sensed by the temperature sensor is below a predetermined temperature.

2. The LCD of claim 1, wherein the power supply supplies the heating voltage to the conductive sealant coupled to the black matrix when the temperature sensed by the temperature sensor is below the predetermined temperature.

3. The LCD of claim 1, wherein the LCD further comprises an auxiliary electrode disposed between the conductive sealant and the second substrate, and
   the power supply supplies the heating voltage to the auxiliary electrode when the temperature sensed by the temperature sensor is below the predetermined temperature.

4. LCD of claim 1, wherein the predetermined temperature ranges from 10° C. to 25° C.

5. The LCD of claim 1, further comprising a light source for sequentially applying red (R), green (G), and blue (B) lights to pixels on the second substrate, and a light source controller for controlling the light source.

6. The LCD of claim 1, wherein the temperature sensor outputs different control signals corresponding to a plurality of temperature levels, the plurality of temperature levels being included in a temperature range which is below a predetermined temperature.

7. The LCD of claim 6, wherein the power supply supplies heating voltages with different voltage values respectively corresponding to the plurality of temperature levels.

8. The LCD of claim 7, wherein a voltage level of the heating voltage supplied by the power supply increases as the temperature level decreases.

9. A driving method of a liquid crystal display (LCD) comprising a panel including a first substrate on which a conductive black matrix is formed and a second substrate which faces the first substrate, and liquid crystal interposed between the substrates, the first and second substrates being assembled together using a conductive sealant, the driving method comprising:
   sensing a temperature of the panel and/or an environment surrounding the panel; and
   supplying a heating voltage from a power supply to the black matrix through the conductive sealant to heat the black matrix when the sensed temperature is below a predetermined temperature.

10. The driving method of the LCD of claim 9, wherein the supplying the heating voltage comprises:
    determining a temperature level that corresponds to the sensed temperature, among a plurality of temperature levels; and
    applying the heating voltage corresponding to the determined temperature level to the black matrix.

11. The driving method of the LCD of claim 10, wherein a voltage level of the heating voltage increases as the determined temperature level decreases.

* * * * *

UNITED STATES PATENT AND TRADEMARK OFFICE
CERTIFICATE OF CORRECTION

| | | |
|---|---|---|
| PATENT NO. | : 7,508,483 B2 | |
| APPLICATION NO. | : 11/126482 | |
| DATED | : March 24, 2009 | |
| INVENTOR(S) | : Jin-Woo Park et al. | |

It is certified that error appears in the above-identified patent and that said Letters Patent is hereby corrected as shown below:

On the Title Page, items:

| | |
|---|---|
| (75) Inventors: | Delete "Tae-Hyeong Jung" |
| | Insert -- Tae Hyeog Jung -- |
| (73) Assignee: | Delete "Samsung SDI Co., Ltd." |
| | Insert -- Samsung Mobile Display Co., Ltd. -- |
| Column 7, Claim 1, line 20 | Delete "sensors" |
| | Insert -- sensor -- |
| Column 7, Claim 4, line 1 | Before "LCD" |
| | Insert -- The -- |

Signed and Sealed this
Twenty-sixth Day of July, 2011

David J. Kappos
*Director of the United States Patent and Trademark Office*